US006235377B1

(12) United States Patent
Dillon et al.

(10) Patent No.: US 6,235,377 B1
(45) Date of Patent: *May 22, 2001

(54) MICROPOROUS MEMBRANE WITH A STRATIFIED PORE STRUCTURE CREATED IN SITU AND PROCESS

(75) Inventors: Mark E. Dillon, Huntingdon Valley; Richard Brandimarte, Bensalem; Raymond E. Triglia, Levittown, all of PA (US)

(73) Assignee: Bio Med Sciences, Inc., Allentown, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/523,278

(22) Filed: Sep. 5, 1995

(51) Int. Cl.$^7$ .................................................... B32B 7/02
(52) U.S. Cl. ...................... 428/212; 428/218; 428/316.6; 428/421; 428/422; 428/447
(58) Field of Search ............................ 428/310.5, 312.6, 428/315.5, 315.9, 421, 447, 316.6, 422, 212, 218

(56) References Cited

U.S. PATENT DOCUMENTS

| 3,315,020 | 4/1967 | Gore . |
| 4,187,390 | 2/1980 | Gore . |
| 4,277,429 | * 7/1981 | Okita ................................... 264/127 |
| 4,385,093 | * 5/1983 | Hubis ................................. 428/316.6 |
| 4,832,009 | 5/1989 | Dillon . |
| 4,863,604 | * 9/1989 | Lo et al. ................................ 210/490 |
| 4,863,792 | * 9/1989 | Mrozinski .......................... 428/315.5 |
| 4,945,125 | 7/1990 | Dillon et al. . |
| 4,990,544 | * 2/1991 | Asaumi et al. ....................... 521/145 |
| 5,066,683 | 11/1991 | Dillon et al. . |
| 5,094,895 | * 3/1992 | Branca et al. .................... 428/36.91 |
| 5,157,058 | 10/1992 | Dillon et al. . |

OTHER PUBLICATIONS

Sperling, "Interpenetrating Polymer Networks and Related Materials", Plenum Press, New York, 12/1981, pp. 1–5.
Dillon, ME, "Silicone and Poly(tetrafluoroethylene) Interpenetrating Polymer Networks: Brief History, Summary of Recent Developments, and Discussion of Applications", Interpenetrating Polymer Networks, Klempner et al. ed, ACS Books, New York, NY 12/1991, pp. 392–404.
Cherfas, "Stretching the Point", Science, vol. 247, Feb. 9, 1990, pp. 630.
McGraw–Hill Dictionary of Chemical Terms of Parker, ed. McGraw–Hill Book Company, New York, 12/1985, p. 341.*

* cited by examiner

Primary Examiner—Blaine Copenheaver
(74) Attorney, Agent, or Firm—John F. A. Earley; John F. A. Earley, III; Harding, Earley, Follmer & Frailey

(57) ABSTRACT

A microporous membrane is described comprising at least two layers, wherein each layer is characterized by nodes interconnected by fibrils, the layers are bonded by means of plastic flow at temperatures below the melting point of either membrane material, and the pore architecture is formed in situ by an expansion process. A stratified microporous membrane is produced wherein the pore architecture of each layer may be discretely controlled. The article is useful for filtration and medical applications where a pore size gradient is required.

9 Claims, 1 Drawing Sheet

Fig. 1
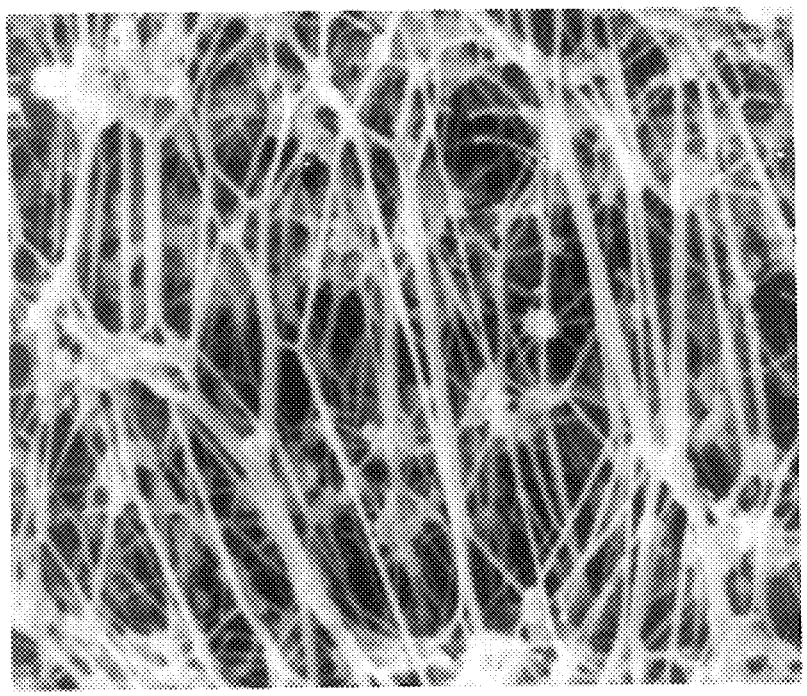
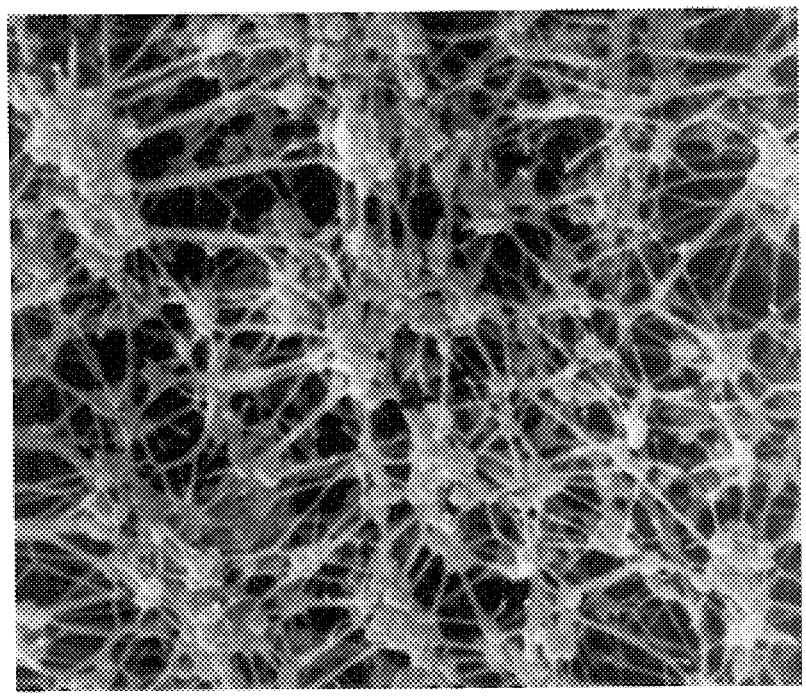
Fig. 2

MICROPOROUS MEMBRANE WITH A STRATIFIED PORE STRUCTURE CREATED IN SITU AND PROCESS

BACKGROUND OF THE INVENTION

1. Field of the Invention

This invention relates to novel microporous membranes, and is partially concerned with expanded polytetrafluoroethylene (PTFE), or expanded interpenetrating polymer networks (IPN) of PTFE and silicone.

2. Description of the Prior Art

In U.S. Pat. No. 3,315,020, there is disclosed a process for preparing sheet-like articles of PTFE which, in the unsintered state, have high elongation and strength in all directions in the major plane of the sheet. In this process, a relatively large cylinder of compacted dispersion grade PTFE particles is passed through a die having two orifices in series. The first orifice is a round, square or rectangular orifice and the second orifice is a long slit-shaped orifice. The extrusion of particulate PTFE is aided by pre-blending with an organic fluid lubricant such as, for example, kerosene, VM&P naphtha or Isobars. The lubricant aids plastic flow of the PTFE particles which coalesce into a cohesive paste under pressure. The extrusion process thereby produces a continuous ribbon of PTFE partially saturated with volatile organic liquid.

The PTFE extrudate ribbon is usually calendered at room temperature while still partially saturated. Calendering involves compression of the ribbon between nip rolls spaced apart by a predetermined distance. Such distance is substantially less than the thickness of the entering extrudate ribbon. Since the entering extrudate ribbon contains lubricant and cold flow is easily effected, elongation of the article in the machine direction occurs by plastic flow in proportion to the difference between entering and exiting thickness at the calender. Normally, the exiting extrudate ribbon is then heated by means of hot rollers to a temperature at which the organic lubricant is volatilized in a reasonable period of time to produce a dried extrudate ribbon.

In the manufacture of PTFE pipe-thread sealant, further orientation of the dried extrudate ribbon is accomplished by linear stretching using differential speed rollers. The amount of stretching is determined by the ratio of the speed of the second roll to the first, i.e., a ratio of 1.75:1 represents an elongation of 75 percent.

In the production of microporous PTFE membranes, linearly oriented extrudate ribbon is stretched in the transverse direction by use of equipment such as a tenter frame or the like. A tenter frame is an apparatus which consists of two gripping conveyors that grab the ribbon by its edges. The conveyors move farther away from one another as they move forward into a tunnel oven. At the end of the oven the grips release. The extrudate ribbon is thereby stretched in the transverse direction in a continuous fashion at elevated temperatures, and may be easily taken-up into rolls.

When the organic lubricant is removed and PTFE extrudate ribbon is stretched, the material does not become thinner as would an ordinary plastic. Instead, PTFE has the unusual ability to undergo an internal fracture process referred to as fibrillation. The PTFE is initially a cohesive bulk. At first application of tensile stress, the bulk breaks apart into clumps of material called nodes. These nodes are connected to each other by fibrils, which are essentially strands of oriented PTFE molecules that are pulled from the nodes. The material thereby becomes microporous, with the pore architecture being determined by the empty space defined by the nodes and fibrils.

In this fashion, the amount of stretching and the ratio of linear to transverse stretching control the pore architecture. As the degree of stretching is increased, the nodes break into smaller structures and increasing amounts of fibrils are created. Thus porosity is increased, but bulk dimensions may not be significantly changed. In membrane manufacture, a sheet may be stretched several thousand percent but only lose half of its thickness, resulting in a net increase in bulk volume. Hence, the process of stretching PTFE into fibrillated structures is referred to as expansion. This effect manifests itself in that some forms of expanded PTFE sheeting can have a negative Poisson ratio in the direction perpendicular to the major planes of the sheet, (Cherfas, 1990).

A collateral effect of the fibrillation process is that increased stretching does not necessarily create larger pores, but may actually decrease the mean pore size of the final product. A relatively small amount of larger pores gives way to a larger amount of small pores. With biaxially expanded PTFE produced from the tenter process, high amounts of linear stretching typically produce a relatively small pore size in the final product. However, with extreme amounts of stretching in either direction, the pore size of such membranes eventually increases as the mass of PTFE nodes is depleted. At this point the bulk material behaves more plastically and further stretching simply elongates the fibrils and increases the distance between nodes until macroscopic holes are produced.

PTFE dispersion grade resin is approximately 95% crystalline, and has a very high melt viscosity. When heated to temperatures above 327° C., the PTFE crystallites deform into an amorphous polymer. When cooled below 327° C., some of the liquid structure remains; thereby increasing the amorphous content of melted PTFE in comparison to virgin PTFE. Such heating and subsequent cooling of the polymer is called sintering. The sintering of shaped microporous PTFE structures produces a thermosetting effect upon the polymer, thus enabling shape retention and thermal stability. Microporous PTFE membranes are typically sintered by creating a high temperature zone in the final stages of the tenter frame apparatus.

In the prior art process of producing PTFE extrudate, difficulties arise in attempts to produce uniform extrudate having satisfactory molecular orientation to facilitate adequate transverse stretching. The molecular orientation of the extrudate ribbon is highly influenced by the rheological properties of the polymer formulation, the pressure applied to the system, and the design of the die. Various grades of PTFE resin provide distinct rheological conditions during extrusion due to different physical and molecular characteristics, therefore different grades of resin produce different degrees of molecular orientation even under the same extrusion conditions. PTFE extrusion systems are complex and difficult to control. Examples of these difficulties are found in U.S. Pat. No. 4,187,390.

In U.S. Pat. No. 4,945,125, there is disclosed a process of producing fibrillated IPNs of PTFE and polyorganosiloxanes. The IPNs are formed by either a sequential method or a simultaneous method. The simultaneous method involves the pre-blending of polysiloxane compositions with the organic lubricant used for extrusion. The siloxane/lubricant blend is then dispersed into the particulate PTFE resin, which is then extruded under similar conditions as those of the prior art. The extrusion and expansion of such IPN products was found to be facilitated by the presence of the siloxane, which apparently acts as an internal lubricant for molecular orientation, and plays a roll in node/fibril formation after volatilization of the organic lubricant.

When skillfully produced, IPN products have been shown to possess increased strength and uniformity in comparison to conventional PTFE products.

In the prior art of producing microporous PTFE membranes or microporous IPN membranes, the pore architecture is homogeneous across the thickness of the sheet. This is due to the fact that (a) the polymer composition, and therefore the rheological extrusion conditions, are homogeneous across the thickness of the extrudate sheet, (b) the orientation caused by the calendering process is applied uniformly throughout the extrudate ribbon, (c) expansion of the extrudate in either direction is applied uniformly across the thickness of the sheet, and (d) sintering affects the entire microstructure of the expanded film.

Those skilled in the art will be familiar with several methods of laminating membranes with different thickness and pore structures together, such as adhesive lamination or thermobonding. With adhesive bonding, two or more layers of microporous membranes are glued together to give the desired pore size gradient. Such adhesives have the detrimental effect of blocking the flow of fluid or gas in proportion to the area covered by the adhesive. Such adhesive systems are also prone to delamination under demanding conditions. Thermobonding is a process which relies on heat and pressure to effect lamination. This process is particularly problematic for PTFE-like polymers which have a very high melting temperature and/or viscosity. With sufficient pressure and temperature, however, microporous PTFE or PTFE/silicone IPN membranes can be laminated together. However, such conditions can adversely effect the microstructure of the membranes by causing deformation. Thermobonded membranes are also prone to delamination because the bonding of the two layers tends to be superficial since the degree of bonding is dependent on the number of contact points between nodes of each membrane and the extent to which molten mass flow is achieved. The high melt viscosity of PTFE limits the effectiveness of this technique.

BRIEF SUMMARY OF THE INVENTION

We have discovered that the pore architecture of PTFE or PTFE/silicone IPN membranes can be discretely controlled in a layered fashion by permanently bonding two or more extrudate ribbons together during a calendering process. By utilizing different extrudate compositions, the degree of molecular orientation caused by extrusion and calendering can be dissimilar for each layer. Since at least one layer of the extrudate ribbon is still partially saturated with organic lubricant at the time of laminating, cold mass flow is easily accomplished and a permanent bond is readily achieved. Any subsequent expansion of the stratified extrudate ribbon produces pore structures of disparate or different architectures in each layer. As a result, the final product is actually a single membrane with a stratified pore structure rather than a lamination of separate membranes. The effect can be further exaggerated by applying different amounts of linear and/or transverse stretching to one or more of the extrudate ribbons prior to calender-bonding. The thickness of each layer is determined by the thickness to which it is calendered prior to lamination, and may be different for each layer of the product.

It is further contemplated that each layer of the stratified ribbon may be independently modified with surfactants and the like prior to lamination to produce a microporous sheeting with different surface properties on each side thereof. Furthermore, multi-layered articles may be produced by repeating the process in series. Alternatively, multiple layers of the same polymer formulation may be laminated together to permit the expansion of extrudate ribbon of a thickness greater than that which can be achieved with a given extrusion die.

The product of this process is useful for numerous applications. For example, stratified pore architectures have obvious usefulness in filtration processes. A very thin film with a small pore size may be attached to a thicker membrane with a larger pore size. The effect is to have most of the filter efficiency of the thin, small pore size membrane; while having the overall physical integrity of the thicker membrane. Since an adhesive is not used in this process, the flow rate and efficiency of the filtration system is not decreased by the blockage of open pores. Since the expansion process creates pore size gradients in situ, the crushing effect of thermobonding two microporous membranes is avoided.

This invention relates more particularly to a microporous layered membrane with a stratified pore structure across its thickness. One layer of the membrane has a mean pore size which is substantially smaller or larger than the mean pore size in the other layer(s). This stratified pore structure is created in situ by the process of 1) extruding polytetrafluoroethylene (PTFE) resin or a PTFE/silicone interpenetrating polymer network (IPN) into a first ribbon; 2) optionally, calendering said first ribbon to a reduced thickness; 3) optionally, orienting said calendered first ribbon by causing stretching in at least one direction; 4) extruding a second PTFE or IPN ribbon of like or dissimilar composition; 5) optionally, calendering said second ribbon to a reduced thickness; 6) laminating the first sheeting material to the second extrudate ribbon during an addition calendering process; 7) orienting the ribbon of step (6) by stretching in at least one direction so as to create a microporous membrane with a stratified pore structure; and 8) optionally, heating the membrane above its crystalline melting point as to cause sintering. The bond between layers of ribbon is achieved under conditions of high plasticity, and the porosity of each layer is determined by the expansion process.

This invention is an improvement over prior art in that (a) the layers of the membrane cannot be separated; (b) an extraneous adhesive system is not required; and (c) the pore structure of the membrane is not subject to the deforming effects of thermobonding separate microporous sheets under pressure. The finished product is suitable for use in separations and medical applications where a pore size gradient is desired.

BRIEF DESCRIPTION OF THE DRAWINGS

The drawings are scanning electron micrographs of Example 4 of this patent application at 6000 power magnification.

FIG. 1 shows the microstructure of the surface of the first ribbon layer which was stretched twice.

FIG. 2 shows the surface of a second ribbon layer that subject to only one pass through the tenter frame apparatus. It is clear from these images that each membrane surface has a morphology which is disparate from the other. The mean inter-nodal distance (as measured by mean fibril length) is 6.4 microns for the first membrane layer and 1.6 microns for the second membrane layer.

DETAILED DESCRIPTION OF SEVERAL EMBODIMENTS

The several embodiments of this invention are disclosed in the following illustrative examples, which are not intended to be limiting. Other variations will be obvious to those skilled in the art.

EXAMPLE 1

Different Polymer Resins

The following blends of ingredients were prepared according to established techniques of mixing:

TABLE I

|  | Amount |
|---|---|
| Blend No. 1: | |
| Cd-123 Fluon ® PTFE Resin (ICI of America) | 9.072 kg |
| Q7-2218 Silastic ® Silicone (Dow Corning) | 0.082 kg |
| Paraffin Solvent | 1.940 kg |
| Blend No. 2: | |
| TE-3641 Teflon ® PTFE Resin (E. I. Dupont) | 9.072 kg |
| Q7-2218 Silastic ® Silicone (Dow Corning) | 0.082 kg |
| Paraffin Solvent | 1.940 kg |

Blend No. 1 was extruded through a slit-orifice die of 1.5×228.6 mm, and calendered to a thickness of 0.64 mm. The partially saturated extrudate was accumulated on a roll and stored for later processing. Blend No. 2 was extruded through the same die and calendered to a thickness of 0.89 mm under identical conditions. The material was accumulated on a roll, which was later mounted on a frame near the extrusion die. Extrusion No. 1 was placed on a similar frame close to the Extrusion No. 2 roll. Both extrusions were unwound and fed back through the calendar with a gap setting of 0.19 mm. The resultant material was passed over a series of heated rollers to remove the organic lubricant and rewound into a roll.

The bilaminar extrudate was indistinguishable from conventionally processed material in that there was no indication of a dual layer structure in the ribbon. The bilaminar material was processed using a tenter frame apparatus and stretched 64 percent in the linear direction and from 76.2 mm to 2.0 m (2,525 percent) in the transverse direction. The temperature of the final heating zone within the tenter frame was raised to effect sintering. The microporous membrane produced was uniform in appearance, free of macroscopic holes, and had a thickness of approximately 17.8 microns.

This example demonstrates a dual layered microporous membrane wherein each layer consists of a different resin grade, but was subjected to identical expansion conditions.

EXAMPLE 2

Same Polymer Resins; Different Extrusion Formulations; Different Expansion Conditions The following blends of ingredients were prepared according to established techniques:

TABLE II

|  | Amount |
|---|---|
| Blend No. 3: | |
| Cd-123 Fluon ® PTFE Resin (ICI of America) | 27.22 kg |
| Q7-2218 Silastic ® Silicone (Dow Corning) | 2.454 kg |
| Paraffin Solvent | 5.820 kg |
| Blend No. 4 | |
| Cd-123 Fluon ® PTFE Resin (ICI of America | 27.22 kg |
| Q7-2218 Silastic ® Silicone (Dow Corning) | 2.454 kg |
| Paraffin Solvent | 5.223 kg |

The process of Example 1 was repeated. The first extrudate was calendered to a thickness of 0.20 mm. The organic lubricant was volatilized, and the extrudate was processed in a tenter frame. The material was longitudinally stretched 5 percent, and transversely stretched from 127 mm to 1.96 m (1,443 percent). The microporous film was taken-up into a roll and measured to have a thickness of approximately 0.127 mm. The roll of microporous film was trimmed and then slit into separate rolls, each of approximately 23 cm in width.

Blend No. 4 was extruded as with the previous materials. Upon entering into the calendering apparatus, the microporous sheeting of Blend No. 3 was unwound onto the partially saturated ribbon of Blend No. 4. The two materials were calendered together to a thickness of 0.10 mm. The bilaminar extrudate was then processed to remove the organic lubricant and rewound onto a roll. As with Example No. 1, this bilaminar extrudate was indistinguishable from conventionally processed material in that there was no indication of a dual layer structure.

The bilaminar extrudate was then processed using a tenter frame to effect a longitudinal stretch of 75 percent and a transverse stretch from 114 mm to 1.96 m (1,619 percent). The temperature of the final heating zone was raised to effect sintering. The finished microporous sheeting material was uniform in appearance, measured approximately 0.025 mm in thickness, and was free of macroscopic holes.

This example illustrates a dual layered membrane where both layers consist of the same polymer composition. However, one layer (the first) was expanded to a greater extent than the other. The following table illustrates the percent expansion for each layer:

TABLE III

|  | Initial Expansion | | Total Expansion | |
| --- | --- | --- | --- | --- |
|  | Linear | Transverse | Linear | Transverse |
| First Layer | 5% | 1,443% | 84% | 26,473% |
| Second Layer | — | — | 75% | 1,619% |

Percent Expansion=100×[(Final Length−Starting Length)/Starting Length]

Example

100×[(1,960−127)/127]=1,443

Percent Total Expansion=100×[(1+Expansion$_1$)×(1+Expansion$_2$)]

Example

100×[(1+14.40)×(1+16.19)]=26,473

EXAMPLE 3

Same Polymer Resins; Different Extrusion Formulations; Different Expansion Conditions A portion of the extrudate from Blend No. 3 was processed using a tenter frame as to achieve a linear stretch of 400 percent and a transverse stretch from 102 mm to 1.96 m (1,822 percent). The resultant microporous film was very thin (0.10 mm), but was free of holes. This material was then slit and laminated to partially saturated extrudate of the composition of Blend No. 4 using a calendar setting of 0.10 mm. The organic lubricant was removed, and the bilaminar extrudate was then processed in a tenter frame to achieve a longitudinal stretch of 9 percent and a transverse stretch from 51 mm to 2.4 m (4,606 percent). As with the previous examples, the temperature of the final heater zone was raised to effect sintering. The resultant microporous membrane was uniform in appearance, measured approximately 0.08 mm in thickness, and was free of holes.

The expansion percentages for each layer are as follows:

TABLE IV

|  | Initial Expansion | | Total Expansion | |
| --- | --- | --- | --- | --- |
|  | Linear | Transverse | Linear | Transverse |
| First Layer | 400% | 1,822% | 545% | 90,449% |
| Second Layer | — | — | 9% | 4,606% |

EXAMPLE 4

Same Polymer Resins; Different Extrusion Formulations; Different Expansion Conditions Example No. 3 was repeated except that the first extrudate was stretched 800 percent instead of 400 percent. The 0.10 mm thick material was laminated to the extrudate formulation of Blend No. 4, stretched 9 percent longitudinally, 4,606 percent in the transverse directions, and sintered. The resultant microporous membrane was uniform in appearance, measured approximately 0.08 mm in thickness, and was free of holes. Table V gives the amount of expansion for each layer.

|  | Initial Expansion | | Total Expansion | |
| --- | --- | --- | --- | --- |
|  | Linear | Transverse | Linear | Transverse |
| First Layer | 800% | 1,825% | 981% | 90,442% |
| Second Layer | — | — | 9% | 4,606% |

EXAMPLE 5

Trilayered Structure; Same Polymer Resins; Different Extrusion Formulations

The following blends of ingredients were prepared according to established techniques:

TABLE VI

|  | Amount |
| --- | --- |
| Blend No. 5: | |
| Cd-123 Fluon ® PTFE Resin (ICI of America) | 27.2 kg |
| Paraffin Solvent | 5.45 kg |
| Blend No. 6: | |
| Cd-123 Fluon ® PTFE Resin (ICI of America) | 27.2 kg |
| Paraffin Solvent | 6.27 kg |
| Blend No. 7: | |
| Cd-123 Fluon ® PTFE Resin (ICI of America) | 27.2 kg |
| Paraffin Solvent | 7.35 kg |

Each blend was extruded separately, and calendered to 0.51 mm. Each partially saturated extrudate ribbon was accumulated on a roll and stored for later processing. The three ribbons were mounted on a frame one above the other, with the ribbon of Blend No. 6 in the middle position. Each layer was unwound and fed back through the calender apparatus in parallel with a setting of 0.18 mm. The resultant material was passed over a series of heated rollers to remove the organic lubricant and rewound into a roll.

The trilaminar extrudate ribbon was processed using a tenter frame apparatus and stretched 100 percent in the linear direction and from 114.3 mm to 1.52 m (1,233 percent) in the transverse direction. The temperature of the final heating zone within the tenter frame was raised to effect sintering. The microporous membrane produced was measured to have a thickness of approximately 17.8 microns.

Having thus described our invention, we claim:

1. A microporous membrane comprising
   at least two discrete layers of membrane material, wherein each layer of membrane material comprises polytetrafluoroethylene, or a polytetrafluroethylene/silicone interpenetrating polymer network, each layer is characterized by nodes interconnected by fibrils, each layer has been subjected to different expansion conditions, wherein prior to bonding at least of said at least two discrete layers comprises a layer which has been subjected to a first stretching step, and wherein at least one other one of said at least two discrete layers comprises a layer which along with the at least one layer, after bonding, has been subjected to an additional second stretching step, and wherein the membrane includes bonding means for bonding the layers together by means of plastic flow at temperatures below the melting point of the membrane material, and each layer has a pore architecture, the pore architecture of each layer being formed in situ by stretching.

2. The microporous membrane of claim 1, wherein at least one layer of the microporous membrane is polytetrafluoroethylene.

3. The microporous membrane of claim 1, wherein at least one layer of the microporous membrane is an interpenetrating polymer network of polytetrafluoroethylene and polysiloxane.

4. The microporous membrane of claim 1, wherein each layer is comprised of different polymer formulations.

5. The microporous membrane of claim 1, wherein each layer has been subjected to different rheological conditions of extrusion.

6. The microporous membrane of claim 1, wherein the mean pore size of each layer is disparate, wherein prior to bonding at least one of said at least two discrete layers comprises a layer which has been stretched to form a layer having a first mean pore size.

7. The microporous membrane of claim 1, wherein at least one layer is polytetrafluoroethylene, and, each layer has been subject to different rheological conditions of extrusion, and the mean pore size of each layer is disparate.

8. The microporous membrane of claim 1, wherein at least one layer is an interpenetrating polymer network of polytetrafluoroethylene and polysiloxane, and, each layer has been subject to different rheological conditions of extrusion, and the mean pore size of each layer is disparate.

9. The microporous membrane of claim 1, wherein at least one layer of the microporous membrane is polytetrafluoroethylene, and at least one layer of the microporous membrane is an interpenetrating polymer network of polytetrafluoroethylene and polysiloxane.

* * * * *

UNITED STATES PATENT AND TRADEMARK OFFICE
CERTIFICATE OF CORRECTION

PATENT NO. : 6,235,377 B1
DATED : May 22, 2001
INVENTOR(S) : Mark E. Dillon, Richard Brandimarte, and Raymond E. Triglia It is certified that error appears in the above-identified patent and that said Letters Patent is hereby corrected as shown below:

Claim 1,
Line 9, after "at least" insert -- one --.

Signed and Sealed this

Thirteenth Day of November, 2001

Attest:

NICHOLAS P. GODICI
Attesting Officer
Acting Director of the United States Patent and Trademark Office